(12) United States Patent
Hittner et al.

(10) Patent No.: US 6,618,640 B1
(45) Date of Patent: Sep. 9, 2003

(54) METHOD AND APPARATUS FOR USING INTEGRATED REMOTE IDENTIFIER

(75) Inventors: Todd Edward Hittner, Austin, TX (US); Jason Alan Grover, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/832,673

(22) Filed: Apr. 11, 2001

(51) Int. Cl.[7] .............................................. G06F 17/10
(52) U.S. Cl. ...................... 700/116; 700/115; 700/121; 235/462.01; 414/940
(58) Field of Search .............................. 700/121, 108, 700/116, 115; 235/462.01; 414/940; 438/14; 29/205

(56) References Cited

U.S. PATENT DOCUMENTS

| | | | | |
|---|---|---|---|---|
| 4,833,306 A | * | 5/1989 | Milbrett | 235/462.01 |
| 6,303,398 B1 | * | 10/2001 | Georigk | 438/14 |
| 6,446,022 B1 | * | 9/2002 | Coss et al. | 700/109 |
| 6,507,765 B1 | * | 1/2003 | Hopkins et al. | 700/116 |

* cited by examiner

*Primary Examiner*—Albert W. Paladini
(74) *Attorney, Agent, or Firm*—Williams, Morgan & Amerson, P.C.

(57) ABSTRACT

The present invention provides for a method and an apparatus for using an integrated remote identifier for processing semiconductor wafers. Process data is associated with a remote identifier. A remote identifier interfacing process based upon the remote identifier is performed. A first processing run of semiconductor devices is performed in response to the remote identifier interfacing process.

36 Claims, 8 Drawing Sheets

METHOD AND APPARATUS FOR USING INTEGRATED REMOTE IDENTIFIER

BACKGROUND OF THE INVENTION

1. Field of the Invention

This invention relates generally to semiconductor manufacturing, and, more particularly, to a method and apparatus for utilizing an identifier, such as a bar code, to perform a control function for semiconductor manufacturing.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes.

Among the factors that affect semiconductor device manufacturing are effectively initiating and continuing a manufacturing process without much human interaction, which can cause delays or errors in the manufacturing process. One of the process steps that is adversely affected by such factors is the photolithography overlay process. Overlay is one of several important steps in the photolithography area of semiconductor manufacturing. Overlay control involves measuring the misalignment between two successive patterned layers on the surface of a semiconductor device. Generally, minimization of misalignment is important to ensure that the multiple layers of the semiconductor devices are connected and functional. As technology facilitates smaller critical dimensions for semiconductor devices, the need for reducing of misalignment errors increases dramatically.

Generally, photolithography engineers currently analyze the overlay errors a few times a month. The results from the analysis of the overlay errors are used to update exposure tool settings manually. Some of the problems associated with the current methods include the fact that the exposure tool settings are only updated a few times a month. Furthermore, currently the exposure tool updates are performed manually. Similarly, improvements in error prevention and correction in other types of semiconductor manufacturing processes are also needed to improve yields in semiconductor manufacturing processes.

Generally, a set of processing steps is performed on a lot of wafers on a semiconductor manufacturing tool called an exposure tool or a stepper. The manufacturing tool communicates with a manufacturing framework or a network of processing modules via an equipment interface, thereby facilitating communications between the stepper and the manufacturing framework. The equipment interface can generally be part of an advanced process control (APC) system. The APC system initiates a control script, which can be a software program that automatically retrieves the data needed to execute a manufacturing process. The input parameters that control the manufacturing process are revised periodically in a manual fashion. As the need for higher precision manufacturing processes are required, improved methods are needed to revise input parameters that control manufacturing processes in a more automated and timely manner. Furthermore, wafer-to-wafer manufacturing variations can cause non-uniform quality of semiconductor devices.

Generally, the equipment interface has to wait for a user input to begin a semiconductor manufacturing process, which may result in lost production time. Furthermore, the user input received by the equipment interface may contain errors, which can result in manufacturing problems. A port, which carries one or more cassettes of semiconductor wafers through out a manufacturing environment, has to be verified before a process can be performed on the semiconductor wafers, which can cause additional delays and errors in the manufacturing process. Furthermore, when a set of semiconductor wafers is sent across a manufacturing environment, it can be difficult for a control system to effectively track the set of semiconductor wafer effectively.

The present invention is directed to overcoming, or at least reducing the effects of, one or more of the problems set forth above.

SUMMARY OF THE INVENTION

In one aspect of the present invention, a method is provided for using an integrated remote identifier for semiconductor manufacturing. Process data is associated with a remote identifier. A remote identifier interfacing process based upon the remote identifier is performed. A first processing run of semiconductor devices is performed in response to the remote identifier interfacing process.

In another aspect of the present invention, an apparatus is provided for using an integrated remote identifier for semiconductor manufacturing. The apparatus of the present invention comprises: a computer system; a manufacturing model coupled with the computer system, the manufacturing model being capable of generating and modifying at least one control input parameter signal; an equipment interface coupled with the manufacturing model, the equipment interface being capable of reading a remote identifier and receiving process data in response to the remote identifier; a processing tool capable of processing semiconductor wafers and coupled with the equipment interface, the first processing tool being capable of receiving at least one control input parameter signal from the equipment interface and performing a manufacturing process; a metrology tool coupled with the processing tool, the metrology tool being capable of acquiring metrology data; and a metrology data processing unit coupled with the metrology tool, the metrology data processing unit being capable of organizing the acquired metrology data and calculating at least one manufacturing error for generating modification data.

BRIEF DESCRIPTION OF THE DRAWINGS

The invention may be understood by reference to the following description taken in conjunction with the accompanying drawings, in which like reference numerals identify like elements, and in which.

Figure 1:
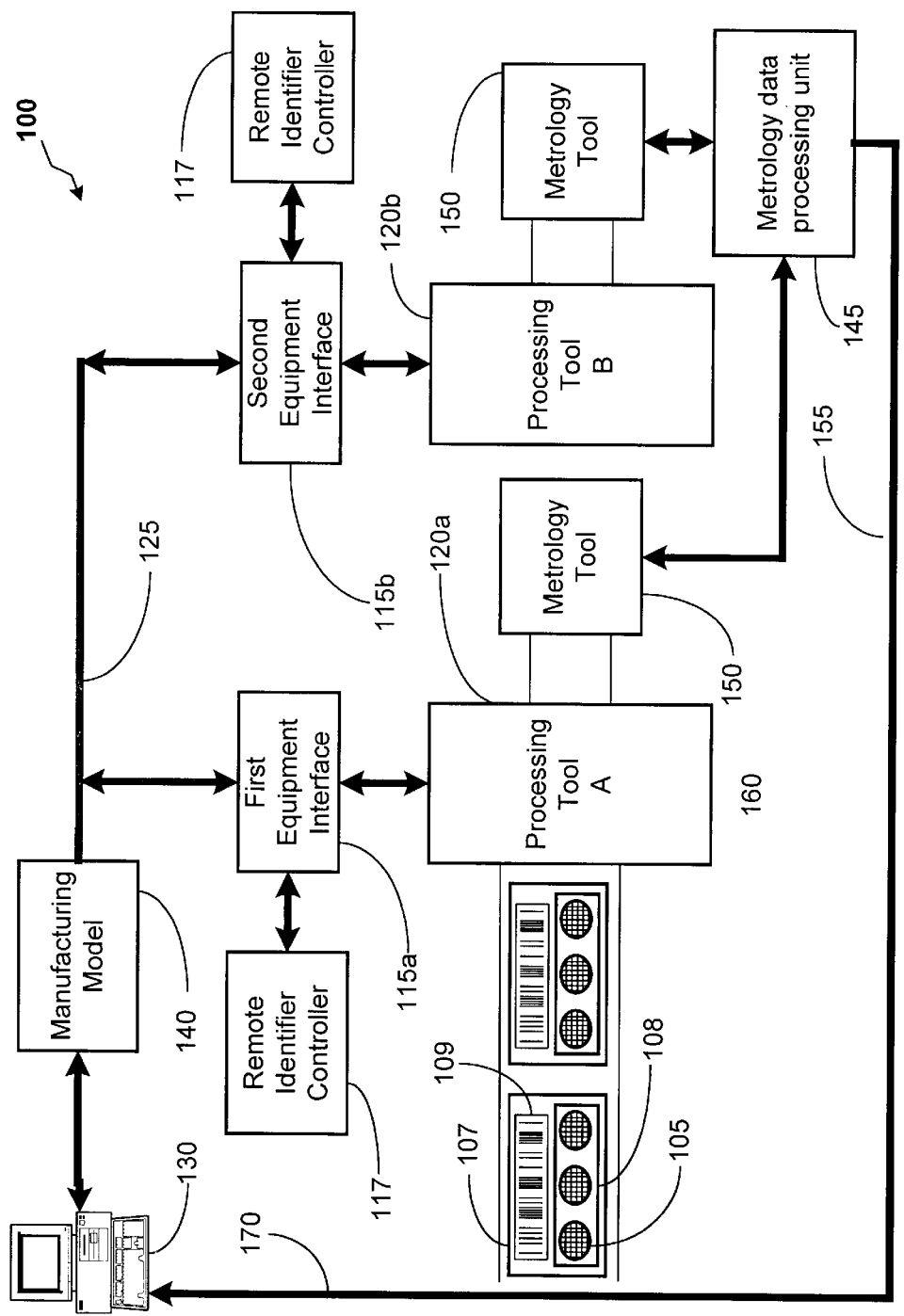
FIG. 1 illustrates a system in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discreet processes that are involved in semiconductor manufacturing. Many times, semiconductor devices are stepped through multiple manufacturing process tools. Wafer-to-wafer, or wafer-lot to wafer-lot, variations can result in an output of non-uniform semiconductor devices. Furthermore, fast, efficient, and accurate identification of materials that are ready to be processed can improve overall results in semiconductor manufacturing environments. Embodiments of the present invention provide for a remote identifier system, such as a barcode system, that can be incorporated into a semiconductor manufacturing system. The remote identifier system of one embodiment of the present invention can produce accelerated and more accurate process data relayed to manufacturing tools downline. The remote identifier system of one embodiment of the present invention can also provide for efficient feedback correction to compensate for manufacturing errors.

Semiconductor devices are processed in a manufacturing environment using a number of input control parameters. Turning now to FIG. 1, a system 100 in accordance with one embodiment of the present invention is illustrated. In one embodiment, semiconductor products 105, such as semiconductor wafers are processed on processing tools 120a, 120b using a plurality of control input signals on a line 125. In one embodiment, control input signals, or process signals, on the line 125 are sent to the processing tools 120a, 120b from a computer system 130 via equipment interfaces 115a, 115b. In one embodiment, the first and second equipment interfaces 115a, 115b are located outside the processing tools 120a, 120b. In an alternative embodiment, the first and second equipment interfaces 115a, 115b are located within the processing tools 120a, 120b.

In one embodiment, the computer system 130 sends control input signals on the line 125 to the first and second equipment interfaces 115a, 115b. The computer system 130 employs a manufacturing model 140 to generate the control input signals on the line 125. In one embodiment, the manufacturing model 140 contains a recipe that determines a plurality of control input parameters that are sent on the line 125.

In one embodiment, the manufacturing model 140 defines a process script and input control that implement a particular manufacturing process. The control input signals on a line 125 that are intended for the processing tool A 120a are received and processed by the first equipment interface 115a. The control input signals on the line 125 that are intended for processing tool B 120b are received and processed by the second equipment interface 115b. Examples of the processing tools 120a, 120b used in semiconductor manufacturing processes are steppers, scanners, step-and-scan tools, and etch process tools. In one embodiment, processing tool A 120a and processing tool B 120b are photolithography process tools, such as steppers. In one embodiment, each equipment interface 115 is coupled with a remote identifier controller 117. The remote identifier controller 117 is capable of reading a remote identifier, such as a barcode, associated with a set of semiconductor devices 105.

One or more of the semiconductor devices 105, such as semiconductor wafers, that are processed by the processing tools 120a, 120b are generally sent to a metrology tool 150 for acquisition of metrology data. The metrology tool 150 can be a scatterometry data acquisition tool, an overlay-error measurement tool, a critical dimension measurement tool, and the like. Data from the metrology tool 150 is processed and organized by a metrology data processing unit 145. In one embodiment, the metrology data processing unit 145 correlates the metrology data to a particular manufacturing lot of processed semiconductor wafers. In one embodiment, the metrology data processing unit 145 is integrated into the computer system 130. In one embodiment, the metrology data processing unit 145 is a computer software program embedded into the computer system 130, wherein the computer system 130 is integrated within APC framework.

Among the bases for modifying the control input signal on the line 125 are metrology measurements performed on the processed semiconductor wafers, such as scatterometry measurements. The metrology measurements are used to perform a feedback modification of the control input signals. In one embodiment, the feedback modification of the control input signals on the line 125 are performed on photolithography processes, such as line width adjustments using photo exposure dosages and line profile adjustments using exposure focus modifications. Feedback modification of the control input signal on the line 125 can also be performed on etch processes, such as etch line shape adjustments using etch recipe modifications.

In the context of a manufacturing process such as a stepper process, the control inputs on the line 125 that are used to operate the processing tool 120 include an x-translation signal, a y-translation signal, an x-expansion wafer scale signal, a y-expansion wafer scale signal, a reticle magnification signal, and a reticle rotation signal. Generally, errors associated with the reticle magnification signal and the reticle rotation signal relate to one particular exposure process on the surface of the wafer being processed in the exposure tool.

Figure 2:
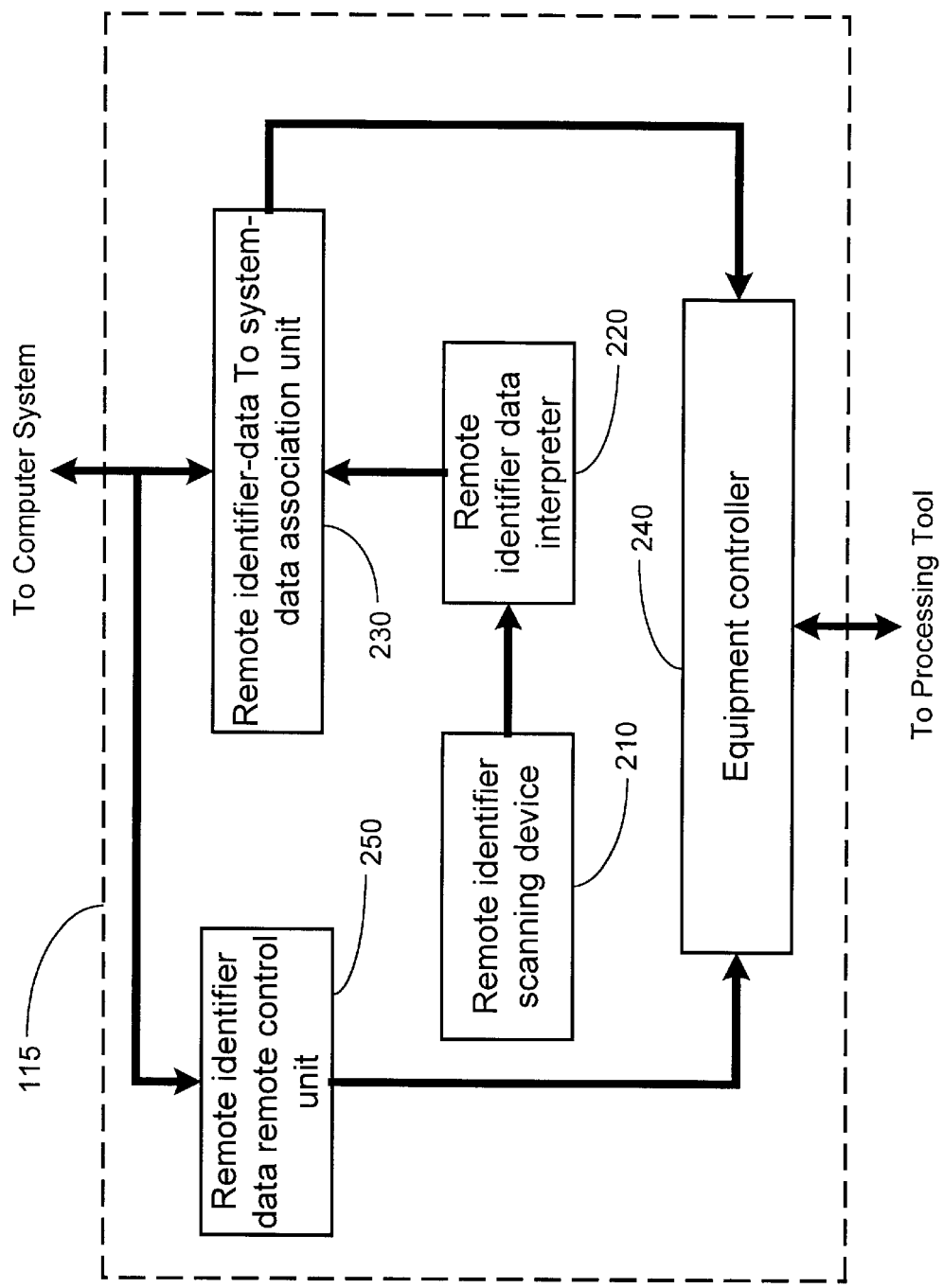
FIG. 2 illustrates a simplified diagram of an equipment interface used by the system in accordance with one embodiment of the present invention.

Turning now to FIG. 2 a block diagram representation of one embodiment of the equipment interface 115, in accordance with the present invention, is illustrated. In one embodiment, the equipment interface 115 comprises a remote identifier scanning device 210, a remote identifier data interpreter 220, a remote identifier system data association unit 230, an equipment controller 240, and a remote identifier data remote control unit 250. One or more of the blocks 210–250 described in FIG. 2 may be comprised of software subsections, hardware subsections, or firmware subsections. The remote identifier scanning device 210 is capable of reading remote identifier (e.g. barcode) representations located on a port 107, which carries a cassette 108 of semiconductor wafers and a remote identifier, such as barcode 109. Although embodiments of the present invention are often described using barcode identifiers, the teachings of the present invention can be implemented using a variety of remote identifiers, such as optical identifiers, sound-based identifiers, and the like. The remote identifier (e.g. barcode) data that is read by the remote identifier scanning device 210 is sent to the remote identifier data interpreter 220. The remote identifier data interpreter 220 is capable of decoding the remote identifier (e.g. barcode) data and recognizing a particular set of semiconductor wafers in the cassette 108 located in any particular port 107.

Once the remote identifier data interpreter 220 decodes the remote identifier (e.g. barcode) data, the remote identifier-data To system-data association unit 230 associates data stored in the system 100, such as in the computer system 130, that correlates to the remote identifier (e.g. barcode) data. In other words, the remote identifier-data to system-data association unit 230 associates a set of wafers in a cassette 108 with data stored in the system 100 such that the data stored in the system 100 is used to process the semiconductor wafers in the cassette 108. The data stored in the system 100 may include material identification data associated with particular semiconductor wafers, the recipe for the process performed on the semiconductor wafers, the type of process to be performed, feedback data for correction during subsequent processes performed on the semiconductor wafers, and the like. The remote identifier (e.g. barcode) data may also include information such as data related to the products type associated with the semiconductor wafers in the port 107, the process stage associated with the semiconductor wafers, and the like.

Once the remote identifier-data to system-data association unit 230 associates process data to a particular remote identifier (e.g. barcode), the equipment controller 240 uses the associated process data to control the processing tools 120 accordingly. Furthermore, the system 100, and more specifically the computer system 130, can utilize the remote identifier data remote control unit 250 to change data associated with a particular remote identifier (e.g. barcode). The computer system 130 can also use the remote identifier data remote control unit 250 to control the actions of the equipment controller 240 in response to decoding of a particular remote identifier (e.g. barcode) 109. Therefore, the computer system 130 can override pre-existing process instructions and instruct the processing tool 120 to change its behavior via the remote identifier data remote control unit 250 and equipment controller 240. Thus, the equipment interface 115 is capable of reading a remote identifier (e.g. barcode) 109 on a port 107 and controlling the processing of the semiconductor wafers in the port 107 by reading the remote identifier (e.g. barcode) 109 and receiving instructions and other process data associated with the remote identifier (e.g. barcode) 109 from the computer system 130.

Figure 3:
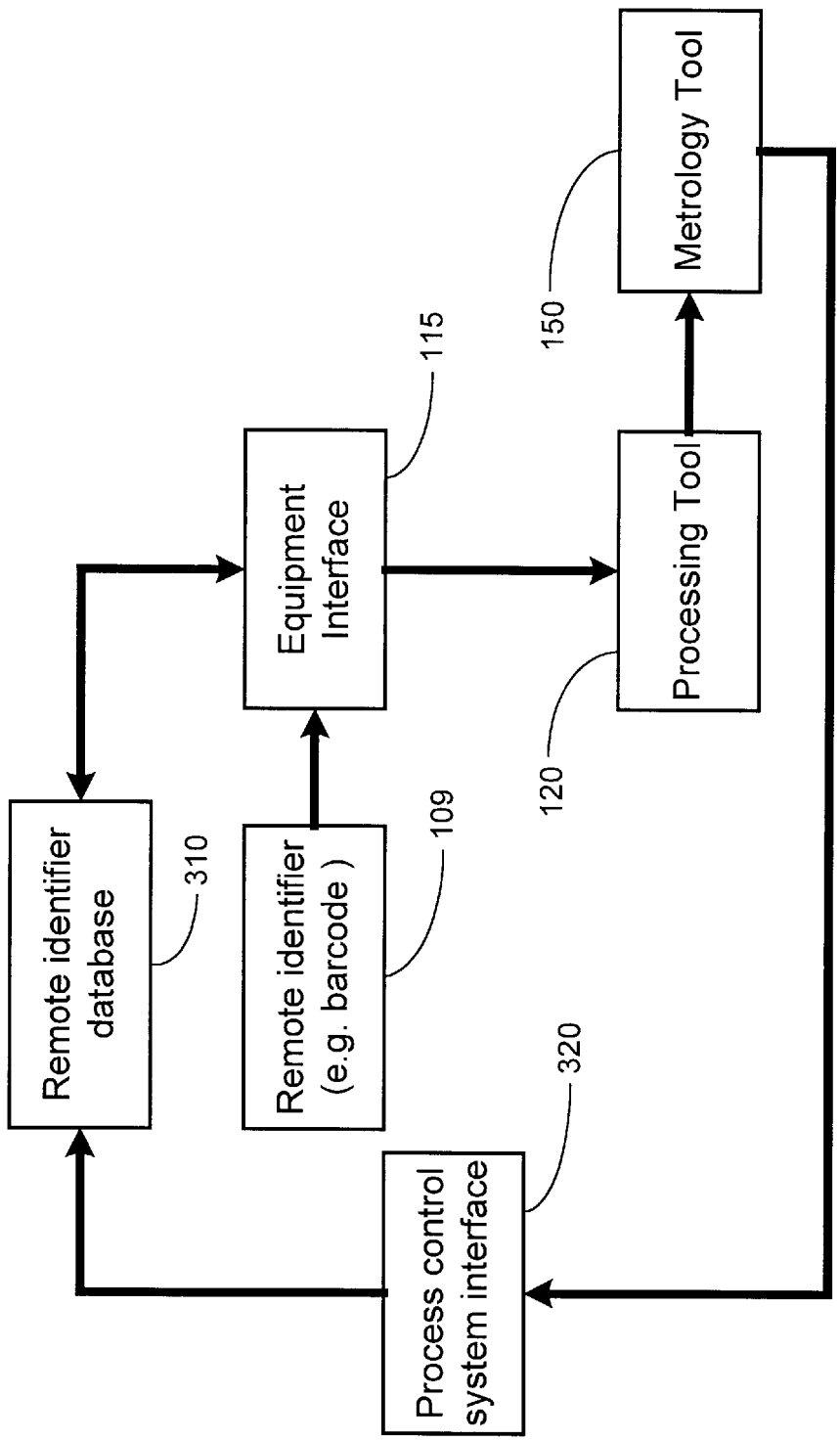
FIG. 3 illustrates a feedback path for performing feedback corrections in accordance with one embodiment of the present invention.

The remote identifier (e.g. barcode) reading process described in the embodiments of the present invention can be utilized to generate a feedback path in a semiconductor manufacturing processing system to improve the performance of semiconductor manufacturing processes. Turning now to FIG. 3, one embodiment of a feedback path in accordance with the remote identifier (e.g. barcode) reading process of the present invention, is illustrated. The remote identifier (e.g. barcode) 109, which in one embodiment is placed on the port 107, is read by the equipment interface 115. The equipment interface 115 decodes the remote identifier (e.g. barcode) data and communicates with a remote identifier database 310 in order to acquire process data corresponding to a particular set of semiconductor wafers relating to a particular remote identifier (e.g. barcode). Data from the remote identifier database 310 contains data that enables the equipment interface 115 to control the manufacturing process performed by the processing tool 120.

Once a process is substantially completed by the processing tool 120 the semiconductor wafers associated with a particular remote identifier (e.g. barcode) 109, is examined by the metrology tool 150. The metrology tool 150 acquires manufacturing data such as critical dimension values, overlay error values, and the like, from processed semiconductor wafers. Data from the metrology tool 150 is sent to the process control system interface 320, which enables the system 100 to calculate corrections and modifications in order to compensation for manufacturing errors. In one embodiment, the process control system interface 320 is an interface to the APC system.

Subsequently, the system 100 calculates correction factors and modification factor to modify manufacturing parameters, using data from the metrology tool 150. The system 100 then updates the data in the remote identifier database 310 with new manufacturing parameters. Therefore, when the equipment interface 115 accesses the remote identifier database 310 based upon the decoding of the remote identifier (e.g. barcode) 109, the equipment interface 115 receives updated processing data for subsequent processes performed by the processing tool 120. In other words, the remote identifier database 310 and the remote identifier (e.g. barcode) reading abilities of the equipment interface 115, is utilized by the system 100 to calculate errors, correct errors, and provide a feedback mechanism for the equipment interface 115.

Figure 4:
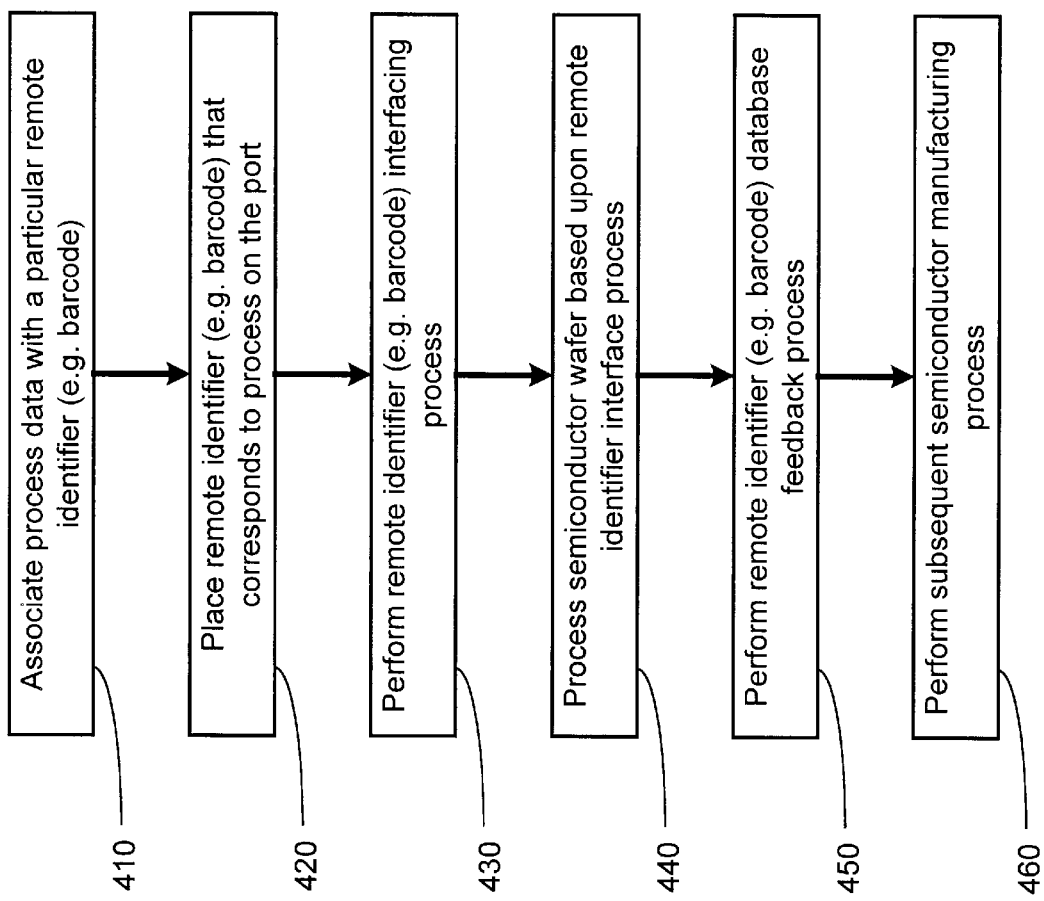
FIG. 4 illustrates a flowchart depiction of the method in accordance with one embodiment of the present invention.

Turning now to FIG. 4, a flowchart representation of one embodiment of the method for utilizing remote identifier (e.g. barcode) systems in a semiconductor manufacturing environment, is illustrated. In one embodiment, the system 100 associates process data with a particular remote identifier (e.g. barcode) 109 [block 410]. The process data comprises the material identification, such as a type of material to be used in the semiconductor manufacturing process, the process type (i.e. photolithography process, etch process, etc.), the process recipe (i.e. the exposure time, the exposure size, the amount of ion implant, etc.), and feedback alterations that affect processing of semiconductor wafers. The process data associated with a remote identifier (e.g. barcode) 109 is generally stored into the remote identifier database 310. In one embodiment the remote identifier database 310 is located within the computer system 130. The remote identifier (e.g. barcode) 109 is then placed on a port 107, which is capable of holding a plurality of semiconductor wafers in a cassette 108 [block 420]. The semiconductor wafers placed in the port 107 are to be processed using the process data associated with the remote identifier (e.g. barcode) 109 that is placed upon the port 107. The port 107 that contains the remote identifier (e.g. barcode) 109 and the semiconductor wafers to be processed are sent downline towards a processing tool 120 for manufacturing processes.

Figure 5:
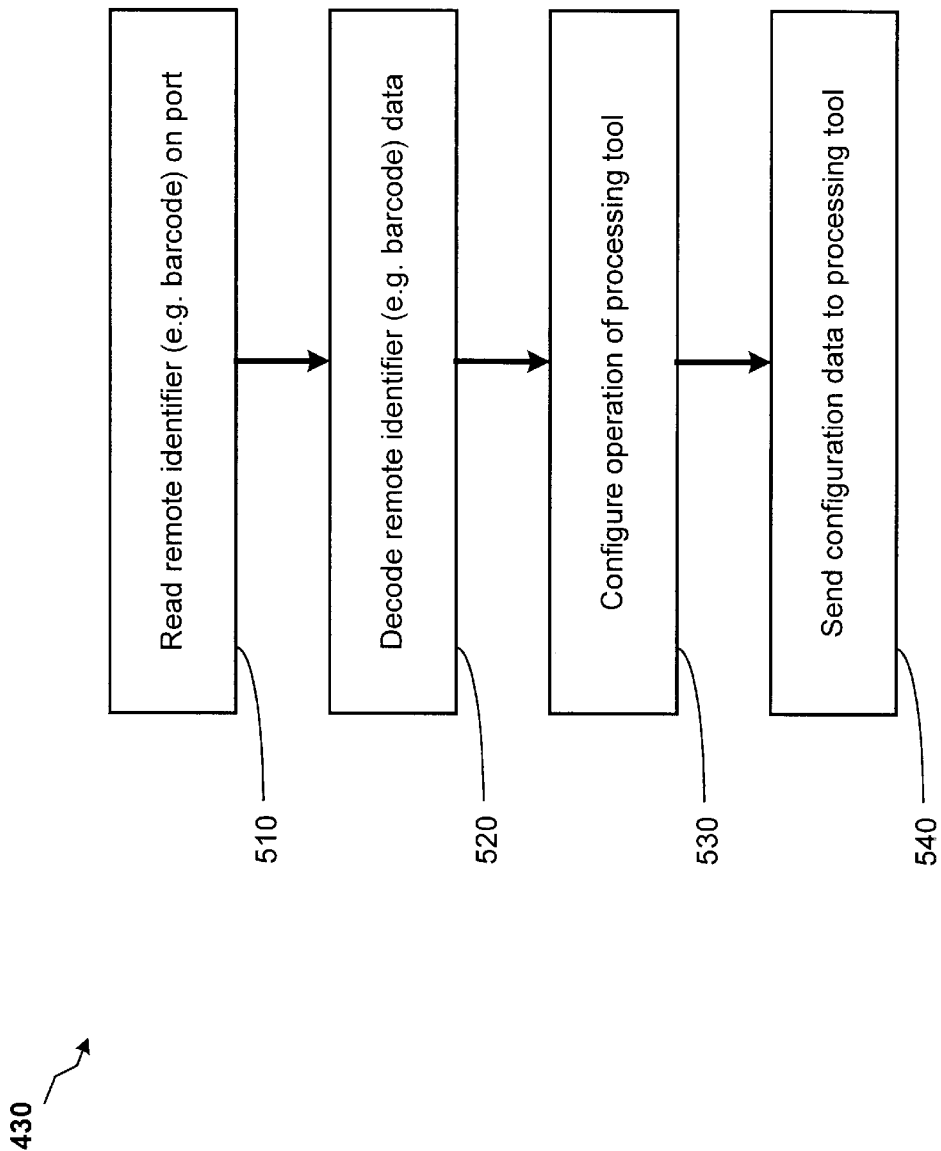
FIG. 5 illustrates a flowchart depiction of a method of performing bar code interfacing process described in FIG. 4, in accordance with one embodiment of the present invention.

The system 100 then performs a remote identifier (e.g. barcode) interfacing process upon the port 107 that contains the remote identifier (e.g. barcode) 109 [block 430]. A more detailed flowchart depiction of the steps for performing the barcode interfacing process described in block 430 of FIG. 4, is illustrated in FIG. 5. Turning now to FIG. 5, the equipment interface 115 reads the remote identifier (e.g. barcode) 109 that is placed on the port 107 [block 510]. In on embodiment, the remote identifier (e.g. barcode) 109 is read by the remote identifier scanning device 210, which is located in the equipment interface 115. The equipment interface 115 then decodes the remote identifier (e.g. barcode) data that it receives by reading the barcode 109 [block 520]. The barcode data is decoded by the remote identifier data interpreter 220, which in one embodiment, is located within the equipment interface 115.

The system 100 then performs a configuration operation of the processing tool 120, based upon the process data associated with a particular remote identifier (e.g. barcode) 109 [block 530]. The configuration of the processing tool, in one embodiment, is performed by the equipment interface 115 based upon the process data associated with a particular barcode 109, which is received from the remote identifier database 310. The equipment interface 115 controls the operation of the processing tool 120, using the equipment controller 240. The equipment interface 115 then sends configuration data, via the equipment controller 240, to the processing tool 120 for processing of the semiconductor wafers located in the port 107 that contains the remote identifier (e.g. barcode) used to configure the processing tool 120 [block 540].

Figure 6:
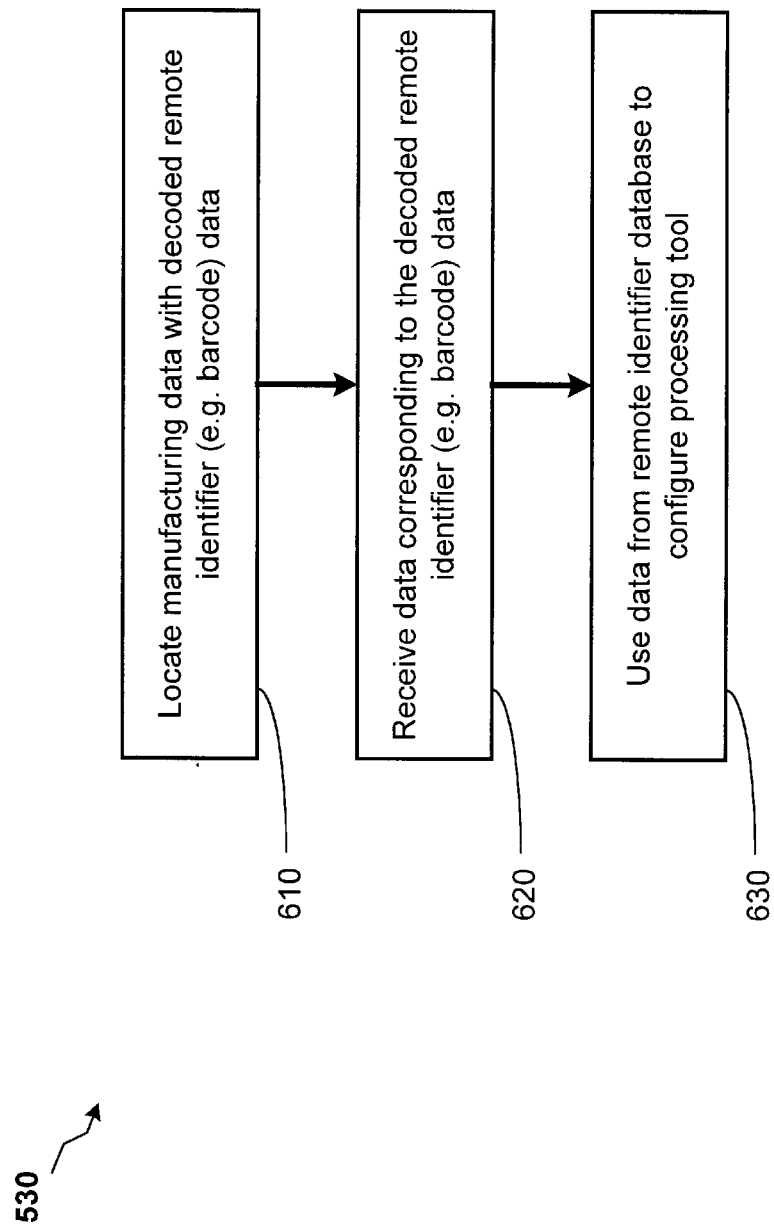
FIG. 6 illustrates a flowchart depiction of a method of performing a configuration operation of a processing tool described in FIG. 5, in accordance with one embodiment of the present invention.

Turning now to FIG. 6, one embodiment of the steps for performing the configuration operation of the processing tool 120, which is described in block 530 of FIG. 5, is illustrated. The equipment interface 115 locates manufacturing system data, or processing data, using the decoded remote identifier (e.g. barcode) data [block 610]. In one embodiment the remote identifier-data to system-data association unit 230 associates data stored in the remote identifier database 310 with the decoded remote identifier (e.g. barcode) data. The equipment interface 115 then receives data corresponding to the decoded remote identifier (e.g. barcode) data from the remote identifier database 310 [block 620]. The equipment interface 115 then utilizes the data from the remote identifier database 310 to configure one or more processing tools 120 [block 630]. The processing tool 120 will perform the manufacturing tasks upon the semiconductor wafers based upon the directions prescribed by the data stored in the remote identifier database 310. Therefore, feedback data based upon calculated errors can be stored into the remote identifier database 310, which is used by the equipment interface 115 to control subsequent processing of the semiconductor wafers.

Turning back to FIG. 4, once the remote identifier (e.g. barcode) interfacing process described in block 430 is performed, the semiconductor wafers in the port 107 are processed using the data associated with the remote identifier (e.g. barcode) 109 on the port 107 [block 440]. The semiconductor wafers are processed using the recipes and the process type data prescribed by the data from the remote identifier database 310. The system 100 also performs a remote identifier (e.g. barcode) database feedback process to process the semiconductor wafers in the port 107 [block 450]. A flowchart depiction of the steps of performing the remote identifier (e.g. barcode) database feedback process, in accordance with one embodiment of the present invention, is illustrated in FIG. 7.

Figure 7:
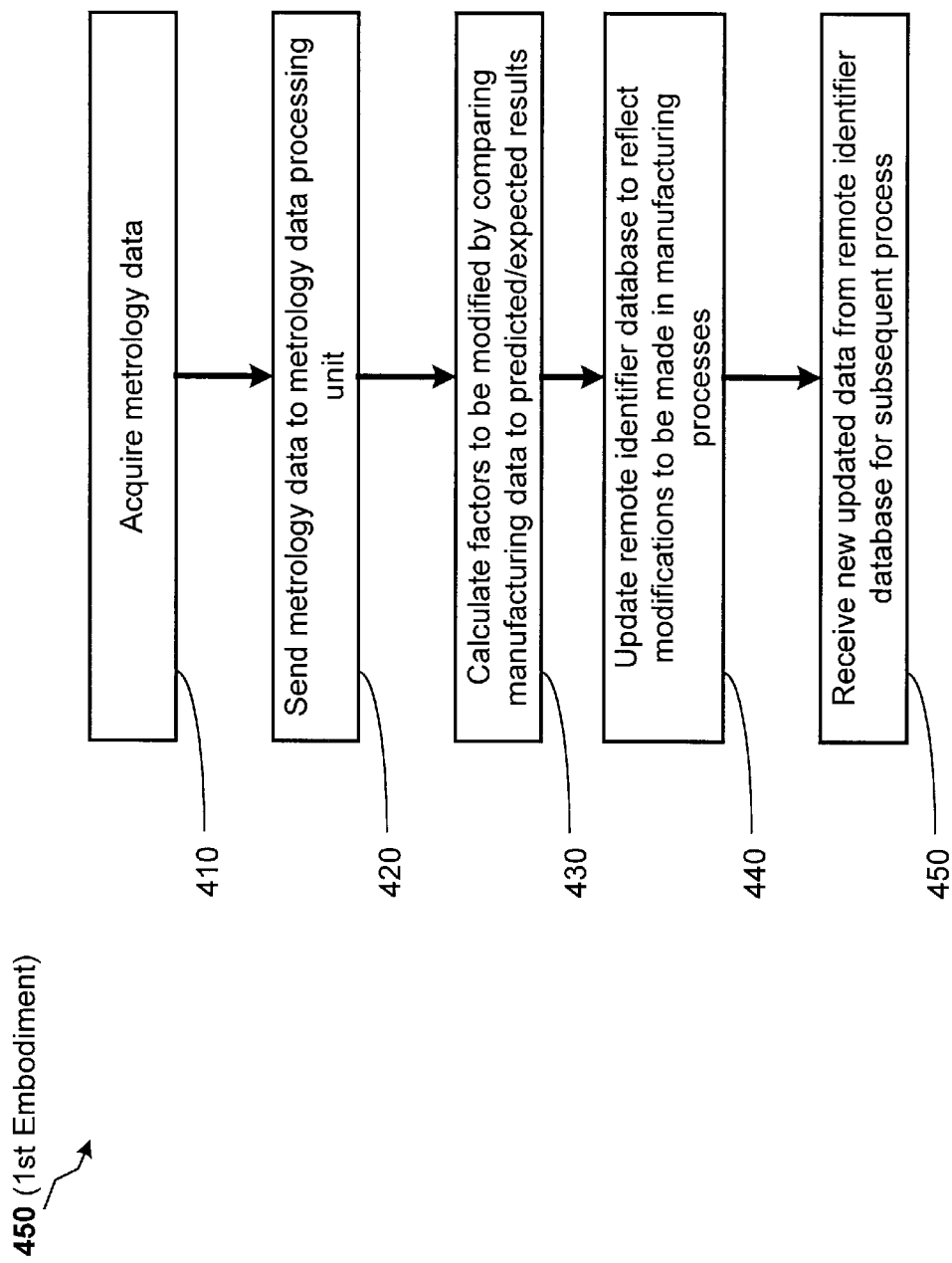
FIG. 7 illustrates a flowchart depiction of a first embodiment of a method of performing a remote identifier database feedback process described in FIG. 5, in accordance with one embodiment of the present invention.

Turning now to FIG. 7, once a manufacturing process is performed on the semiconductor wafers from the port 107, the system 100 acquires metrology data resulting from the process [block 710]. In one embodiment, the metrology data is acquired by the metrology tool 150. In one embodiment, metrology data from the metrology tool 150 is sent to the metrology processing unit 145 for analysis of errors resulting from the previous manufacturing process [block 720]. In one embodiment, the metrology data processing unit 145 is integrated into the computer system 130.

The metrology data processing unit 145 calculates manufacturing parameters that are to be modified as a result of the metrology data [block 730]. In one embodiment, the manufacturing parameters that are to be modified are calculated by comparing manufacturing data received from the metrology tool 150 with predicted or expected results calculated by the manufacturing model 140. Examples of the manufacturing parameters that are to be modified include exposure tool modification, such as exposure time parameters. Another example includes modifying etching tool parameters based upon critical dimension errors detected by the manufacturing tool 150.

The system 100 updates the remote identifier database 310 to reflect modifications that are to be made in subsequent manufacturing processes of the semiconductor wafers in the port 107 [block 740]. Updating of the remote identifier database 310 is based upon the calculations of the manufacturing parameters that are modified, and are stored into the remote identifier database 310 for retrieval by the equipment interface 115. The equipment interface 115 reads the updated data from the remote identifier database 310 based upon decoding of the remote identifier (e.g. barcode) performed by the equipment interface 115 [block 750]. The updated data from the remote identifier database 310 is then used to modify and control subsequent processing of semiconductor wafers from the port 107. Therefore, a feedback cycle, which includes performing a manufacturing process, acquiring error data relating the manufacturing process, calculating modifications of manufacturing parameters based upon the error from the previous manufacturing process, and storing the modified manufacturing parameters into a database for retrieval by an equipment interface 115 for use in controlling subsequent manufacturing processes, is formed.

Figure 8:
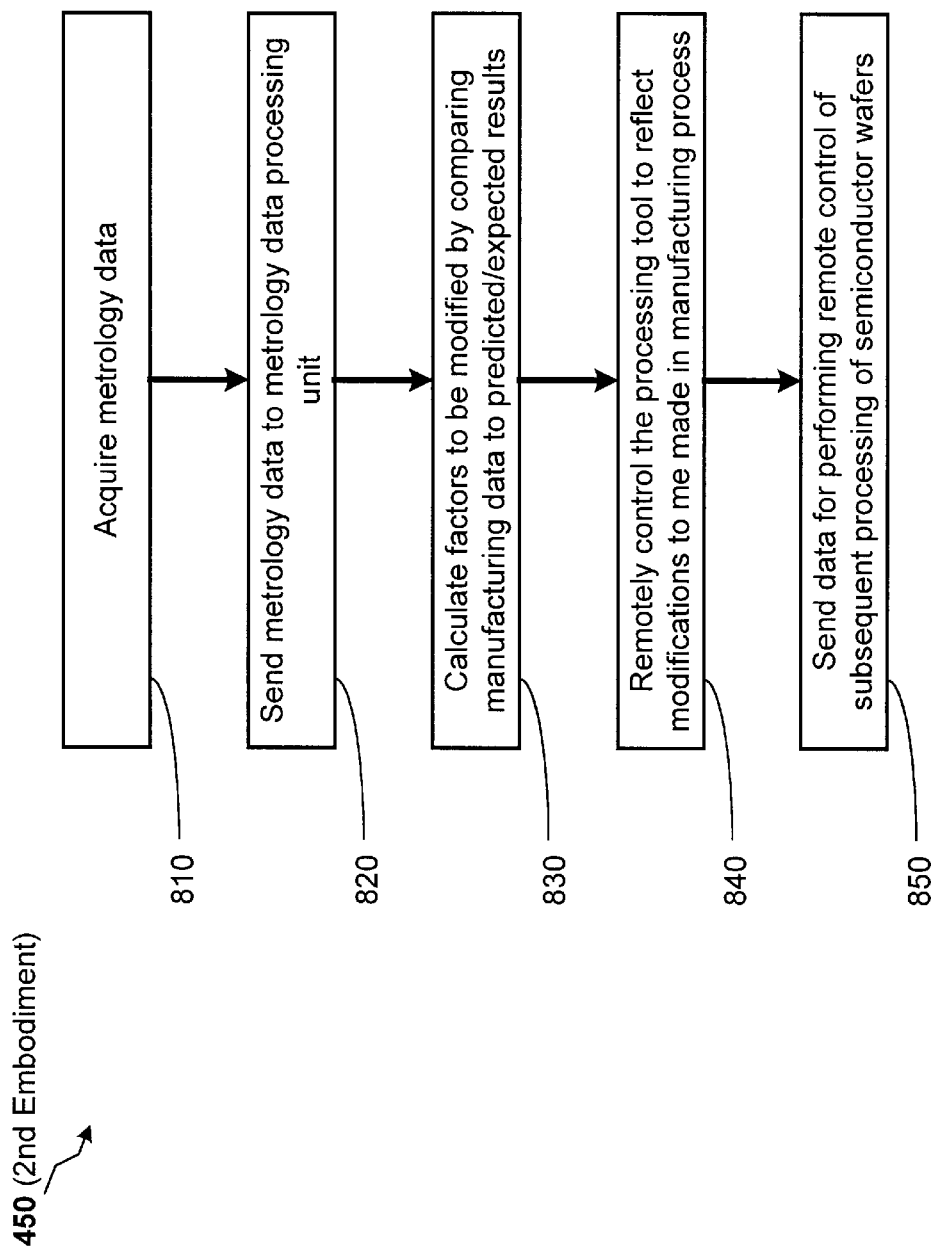
FIG. 8 illustrates a flowchart depiction of a first embodiment of a method of performing a remote identifier database feedback process described in FIG. 5, in accordance with one embodiment of the present invention.

Turning now to FIG. 8, and alternative embodiment of performing the remote identifier (e.g. barcode) database feedback process described in block 450 of FIG. 4, is illustrated. Similar to the steps described in FIG. 7, metrology data is acquired after the processing of the semiconductor wafers from the port 107 [block 810]. The metrology data that is acquired from the processed semiconductor wafers is then sent to the metrology data processing unit 145 for further analysis [block 820]. The metrology data is used the calculate modifications to manufacturing parameters by comparing manufacturing data to predicted or expected results, as determined by the manufacturing model 140 [block 830].

The system 100 then uses the modified manufacturing parameters to remotely control the processing tool 120 to reflect the modifications to be made during subsequent processing of semiconductor wafers [block 840]. In one embodiment, the computer system 130 uses the remote identifier data remote control unit 250 in the equipment interface 115 in order to control the processing tool 120 for performing subsequent processing of the semiconductor wafers from the port 107. The equipment controller 240 receives the remote control data from the remote identifier data remote control unit 250 and accordingly performs subsequent processing of semiconductor wafers from the port 107 [block 850].

Turning back to FIG. 4, once the remote identifier (e.g. barcode) database feedback process described in block 450 is substantially completed, subsequent processing of the semiconductor wafers from the port 107 is performed by the system 100 [460]. The steps described in FIGS. 4–8 can be implemented to perform a variety of semiconductor manufacturing processes, such as photolithography process, etching process, RTA process, and the like. The methods taught by embodiments of the present invention can also be utilized for other types of manufacturing environments. Utilization of the remote identifier (e.g. barcode) method described by embodiments of the present invention allows for an equipment interface 115 and an associated processing tool 120 to efficiently implement a manufacturing task with reduced delay, such as the waiting period for data entry for operations by an operator.

Furthermore, embodiments of the present invention allow for semiconductor wafer lot tracking within a manufacturing environment. The system described by the present invention can be used to track where materials, such as semiconductor wafers, are located in a manufacturing environment. Using the techniques of embodiments of the present invention, manufacturing processes can be tracked to determine where in the process a particular set of semiconductor wafers is located at a given period of time. Obtaining more efficient status relating to the state and location of manufacturing materials, provided by embodiments of the present invention, can improve the efficiency of manufacturing processes.

The principles taught by the present invention can be implemented in an Advanced Process Control (APC) Framework. The APC is a one platform from which to implement the process control strategy taught by the present invention. In some embodiments, the APC can be a factory-wide software system, therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code.

Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system. The principles taught by the present invention can be implemented into other types of manufacturing frameworks.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   correlating process data with a remote identifier capable of identifying one or more semiconductor devices;
   performing a remote identifier interfacing process based upon said remote identifier, said remote identifier interfacing process comprising determining at least one process control parameter for processing at least one of said semiconductor devices based upon said correlating of process data with said remote identifier; and
   performing a processing run of at least one of said semiconductor devices in response to said remote identifier interfacing process.

2. The method described in claim 1, wherein associating process data with a remote identifier further comprises associating process data with a barcode.

3. The method described in claim 1, wherein performing the first processing run of semiconductor devices further comprises processing semiconductor wafers.

4. The method described in claim 1, wherein performing a remote identifier interfacing process based upon said remote identifier comprises:
   reading the remote identifier associated with a set of semiconductor wafers to acquire remote identifier data;
   decoding the remote identifier data;
   receiving said process data associated with said remote identifier data; and
   configuring a processing function based upon said process data associated with said remote identifier data.

5. The method described in claim 1, further comprising:
   performing a remote identifier database feedback process; and
   performing a second processing run of semiconductor wafer based upon said remote identifier database feedback process.

6. The method described in claim 5, wherein performing the remote identifier database feedback process comprises:
   acquiring metrology data resulting from said first processing of semiconductor wafers;
   processing said metrology data;
   calculating new process data in response to said processing of said metrology data; and updating a remote identifier database to include said new process data.

7. The method described in claim 6, wherein acquiring metrology data resulting from said first processing of semiconductor wafers comprises using a metrology tool to acquire metrology data.

8. The method described in claim 6, wherein processing said metrology data comprises calculating at least one manufacturing error.

9. The method described in claim 8, wherein calculating new process data in response to said processing of said metrology data further comprises calculating modified manufacturing parameters based upon said manufacturing error.

10. The method described in claim 5, wherein performing a remote identifier database feedback process comprises:

acquiring metrology data resulting from said first processing of semiconductor wafers;

processing said metrology data;

calculating new process data in response to said processing of said metrology data; and remotely controlling a manufacturing process in response to said new process data.

11. The method described in claim 10, wherein acquiring metrology data resulting from said first processing of semiconductor wafers comprises using a metrology tool to acquire metrology data.

12. The method described in claim 10, wherein processing said metrology data comprises calculating at least one manufacturing error.

13. The method described in claim 12, wherein calculating new process data in response to said processing of said metrology data further comprises calculating modified manufacturing parameters based upon said manufacturing error.

14. A system, comprising:

a computer system;

an equipment interface coupled with said manufacturing model, said equipment interface being capable of reading a remote identifier capable of identifying one or more semiconductor devices and using data from the remote identifier to acquire process data corresponding to said one or more semiconductor devices;

a processing tool capable of processing semiconductor wafers and coupled with said equipment interface, said first processing tool being capable of receiving at least one control input parameter signal from said equipment interface and performing a manufacturing process; and a metrology tool coupled with said processing tool, said metrology tool being capable of acquiring metrology data for generating modification data.

15. The system of claim 14, wherein said remote identifier is a barcode.

16. The system of claim 14, further comprising a remote identifier controller coupled with said equipment interface, the remote identifier controller being capable of reading said remote identifier.

17. The system of claim 16, wherein said computer system is capable of generating modification data based on said manufacturing error for modifying at least one manufacturing parameter.

18. The system of claim 17, wherein said manufacturing model is capable of modifying said manufacturing parameter in response to said modification data.

19. The system of claim 16, wherein said equipment interface further comprising a remote identifier decode unit capable of decoding said remote identifier to receive corresponding process data.

20. The system of claim 16, wherein said equipment interface further comprising a remote control unit capable of allowing said computer system to remotely control said processing tool.

21. The system of claim 14, wherein said remote identifier comprises an optical identifier.

22. The system of claim 14, wherein said remote identifier comprises a sound-based identifier.

23. An apparatus, comprising:

means for correlating process data with a remote identifier capable of identifying one or more semiconductor devices;

means for performing a remote identifier interfacing process based upon said remote identifier, said remote identifier interfacing process comprising determining at least one process control parameter for processing at least one of said semiconductor devices based upon said correlating of process data with said remote identifier; and means for performing a processing run of at least one of said semiconductor devices in response to said remote identifier interfacing process.

24. A computer readable program storage device encoded with instructions that, when executed by a computer, performs a method, comprising:

correlating process data with a remote identifier capable of identifying one or more semiconductor devices;

performing a remote identifier interfacing process based upon said remote identifier, said remote identifier interfacing process comprising determining at least one process control parameter for processing at least one of said semiconductor devices based upon said correlating of process data with said remote identifier; and performing a processing run of at least one of said semiconductor devices in response to said remote identifier interfacing process.

25. The computer readable program storage device encoded with instructions that, when executed by a computer, performs the method described in claim 24, wherein associating process data with a remote identifier further comprises associating process data with a barcode.

26. The computer readable program storage device encoded with instructions that, when executed by a computer, performs the method described in claim 24, wherein performing the first processing run of semiconductor devices further comprises processing semiconductor wafers.

27. The computer readable program storage device encoded with instructions that, when executed by a computer, performs the method described in claim 24, wherein performing the remote identifier interfacing process based upon said remote identifier comprises:

reading the remote identifier associated with a set of semiconductor wafers to acquire remote identifier data;

decoding the remote identifier data;

receiving said process data associated with said remote identifier data; and configuring a processing function based upon said process data associated with said remote identifier data.

28. The computer readable program storage device encoded with instructions that, when executed by a computer, performs the method described in claim 24, further comprising:

performing the remote identifier database feedback process; and performing a second processing run of semiconductor wafer based upon said remote identifier database feedback process.

29. The computer readable program storage device encoded with instructions that, when executed by a computer, performs the method described in claim 28, wherein performing a remote identifier database feedback process comprises:

acquiring metrology data resulting from said first processing of semiconductor wafers;

processing said metrology data;

calculating new process data in response to said processing of said metrology data; and updating a remote identifier database to include said new process data.

30. The computer readable program storage device encoded with instructions that, when executed by a computer, performs the method described in claim 29, wherein acquiring metrology data resulting from said first processing of semiconductor wafers comprises using a metrology tool to acquire metrology data.

31. The computer readable program storage device encoded with instructions that, when executed by a computer, performs the method described in claim 29, wherein processing said metrology data comprises calculating at least one manufacturing error.

32. The computer readable program storage device encoded with instructions that, when executed by a computer, performs the method described in claim 31, wherein calculating new process data in response to said processing of said metrology data further comprises calculating modified manufacturing parameters based upon said manufacturing error.

33. The computer readable program storage device encoded with instructions that, when executed by a computer, performs the method described in claim 28, wherein performing a remote identifier database feedback process comprises:

acquiring metrology data resulting from said first processing of semiconductor wafers;

processing said metrology data;

calculating new process data in response to said processing of said metrology data; and remotely controlling a manufacturing process in response to said new process data.

34. The computer readable program storage device encoded with instructions that, when executed by a computer, performs the method described in claim 33, wherein acquiring metrology data resulting from said first processing of semiconductor wafers comprises using a metrology tool to acquire metrology data.

35. The computer readable program storage device encoded with instructions that, when executed by a computer, performs the method described in claim 33, wherein processing said metrology data comprises calculating at least one manufacturing error.

36. The computer readable program storage device encoded with instructions that, when executed by a computer, performs the method described in claim 35, wherein calculating new process data in response to said processing of said metrology data further comprises calculating modified manufacturing parameters based upon said manufacturing error.

* * * * *

UNITED STATES PATENT AND TRADEMARK OFFICE
CERTIFICATE OF CORRECTION

| | |
|---|---|
| PATENT NO. | : 6,618,640 B1 |
| APPLICATION NO. | : 09/832673 |
| DATED | : September 9, 2003 |
| INVENTOR(S) | : Hittner et al. |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (0) days Delete the phrase "by 0 days" and insert -- by 279 days --

Signed and Sealed this

Nineteenth Day of February, 2008

JON W. DUDAS
*Director of the United States Patent and Trademark Office*